July 27, 1948.

R. HARDY 2,445,779

ELECTROMAGNETIC WAVE DIRECTION RESPONSIVE APPARATUS

Filed May 24, 1943

INVENTOR.
RENE HARDY
BY
ATTORNEY

July 27, 1948.	R. HARDY	2,445,779
ELECTROMAGNETIC WAVE DIRECTION
RESPONSIVE APPARATUS
Filed May 24, 1943	7 Sheets-Sheet 2

INVENTOR.
RENE HARDY
BY
*Edward C. Plimmer*
ATTORNEY

INVENTOR.
RENE HARDY
BY
ATTORNEY

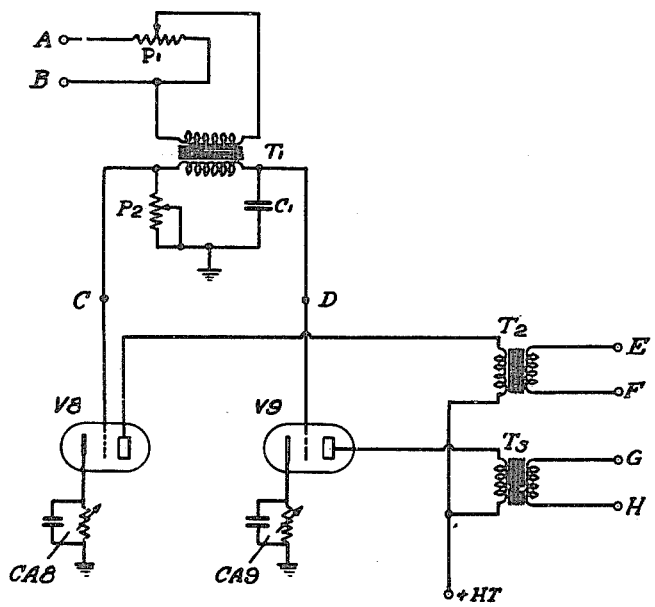
Fig: 9.
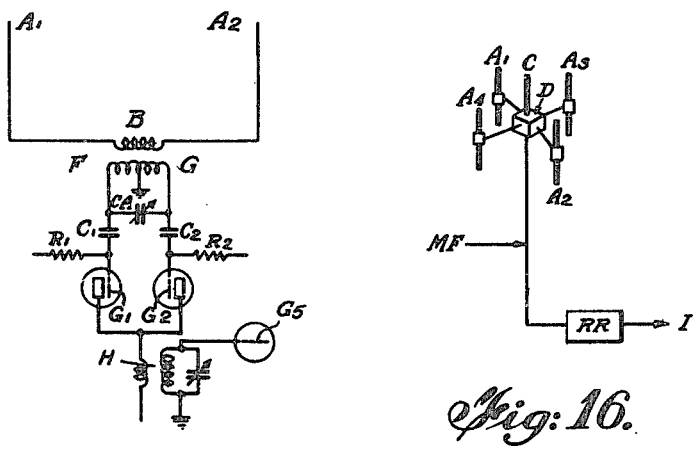
Fig: 15.
Fig: 16.
INVENTOR.
RENE HARDY
BY
ATTORNEY

INVENTOR.
RENE HARDY
BY Edward D. Phinney
ATTORNEY

July 27, 1948.  R. HARDY  2,445,779
ELECTROMAGNETIC WAVE DIRECTION
RESPONSIVE APPARATUS
Filed May 24, 1943  7 Sheets-Sheet 6

INVENTOR.
RENE HARDY
BY Edward D. Phinney
ATTORNEY

Patented July 27, 1948

2,445,779

UNITED STATES PATENT OFFICE 2,445,779

ELECTROMAGNETIC WAVE DIRECTION RESPONSIVE APPARATUS

René Hardy, Lyon, France, assignor to International Standard Electric Corporation, New York, N. Y.

Application May 24, 1943, Serial No. 488,291
In France December 28, 1940

Section 1, Public Law 690, August 8, 1946
Patent expires December 28, 1960

11 Claims. (Cl. 343—121)

The present invention refers to electromagnetic wave direction responsive apparatus and more particularly to direct-reading radio direction finders.

One of the objects of the invention is to provide radio direction finders or similar apparatus comprising no mechanical moving-members for the finding of directions.

Another object of the invention is to provide devices generating variable biasings in static finders of radio direction finders in order to ensure their scanning.

Another object of the invention is to provide means for producing sinusoidal scanning-voltages of exactly similar forms but showing between them invariable phase-differences.

According to certain features of the invention, a radio direction finder comprises two pairs of orthogonal loops, the loops of each pair being wound in opposite directions, each loop-pair supplying respectively a pair of tubes the grids of which are so biased that the amplification coefficient of each of these tubes will vary respectively during equal and alternated periods according to a sinusoidal law, the output currents of the tubes being applied to a mixer tube supplying the receiver of the radio direction finder.

According to another feature of the invention, in the preceding device the loops may be replaced with dipoles respectively connected in phase opposition in each pair.

According to another feature of the invention, the scanning voltages on the grids of the input tubes and on the plates of the cathode-ray indicator are different and synchronous, the sinusoidal voltages applied to the plates of the cathode-ray tube, obtained through a turning collector or other suitable means, being modulated by the output current of the receiver, whose input is supplied by the mixer tube.

According to another feature of the invention, the blocking of the grids of the tubes is obtained by means of two sinusoidal voltages in quadrature, which likewise can be used to cause the circular deflection of the spot on the screen of the cathode-ray indicator associated with the system, whose modulation is effected on an electrode other than the deflecting-plates.

These objects and features, as well as still others, will be explained in detail in the description that follows, given with reference to the accompanying drawings, in which.

Figure 3:
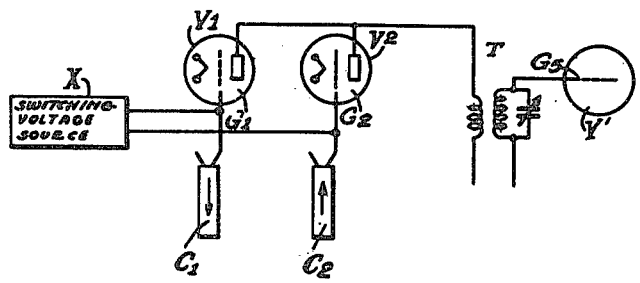
Fig. 3 shows schematically a portion of a circuit of a radio direction finder having no turning-finder, according to certain features of the invention.
Figure 6:
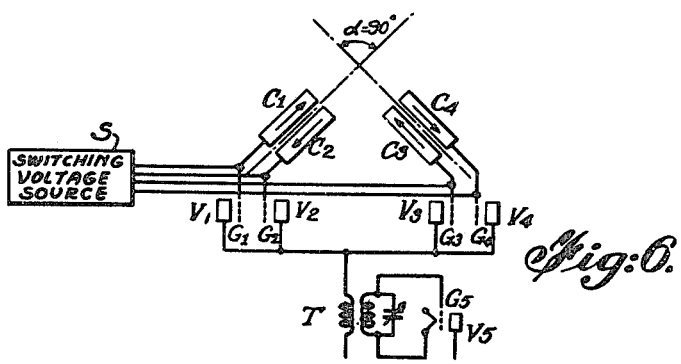
Fig. 6 shows schematically a radio direction-finder circuit incorporating the arrangement shown in Fig. 3.
Figures 7A, 7B:
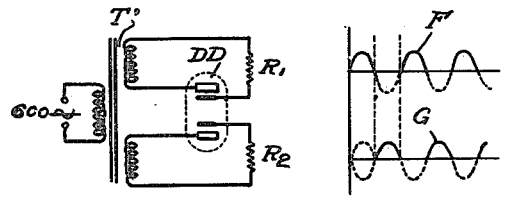
Figures 8A, 8B:
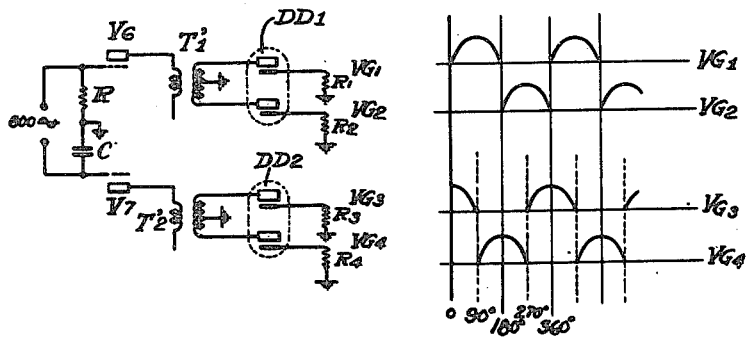
Figure 10:
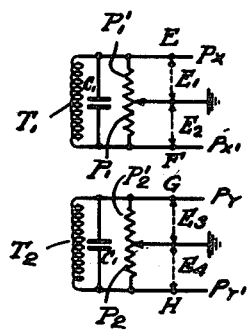
Figure 11:
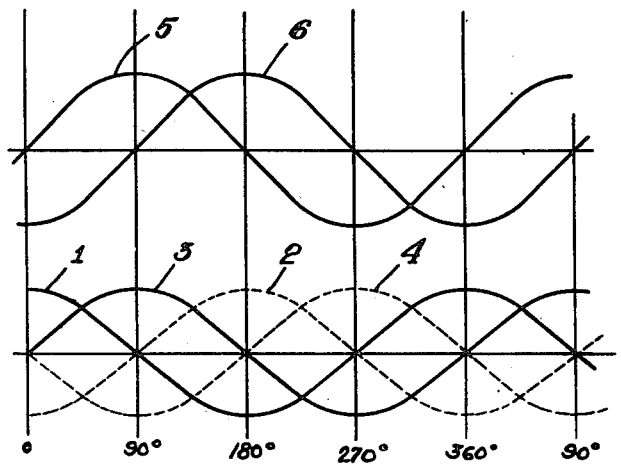

Figs. 7a and 8a show schematically circuits permitting of obtaining out-of-phase sinusoidal scanning-currents, such as shown in Figs. 7b and 8b, respectively, for the control of the tubes of Figs. 3 and 6;

Figs. 9 and 10 show an example of a circuit whereby scanning-sinusoids can be obtained such as shown in Fig. 11; and Figs. 12 to 17 show various examples of radio direction-finder arrangements incorporating features of the invention.

Figure 1:
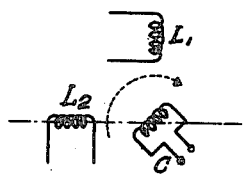
Fig. 1 shows schematically an ordinary turning-finder of a radio direction-finder having stationary wave-collectors.

In Fig. 1 is shown the arrangement of an ordinary finder having two stationary windings L1 and L2, preferably orthogonal, respectively supplied by two orthogonal wave-collecting antennas, and having a turning-rotor C inductively coupled to the two windings L1 and L2.

Figure 2:
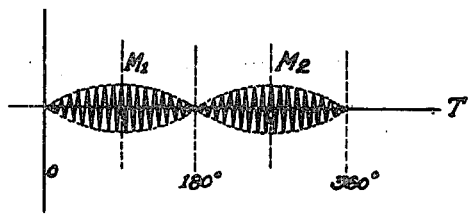
Fig. 2 shows the variation of the currents obtained in the rotor of the finder shown in Fig. 1.

In its rotation, rotor C is subjected to a field that varies for each winding L1 and L2 according to a sinusoidal law the shape of whose envelope curve is shown in Fig. 2 for a complete turn of C. If, however, the two maxima M1 and M2 are of equal amplitude, it should be noted that the phase of the high-frequency currents contained in that envelope is displaced by 180° and that it is obviously in opposition in both cases, being reversed when the amplitude goes to zero. With respect to the other winding the phenomenon is the same in rotor C but displaced by 90°, and this displacement characterizes the position of the respective minima of the envelopes of L1 and L2.

It should be noted also that the high-frequency currents in windings L1 and L2 have values that depend upon the orientation of the transmitter; the phase of these currents at a given moment depends likewise, at about 180°, upon the direction of the transmitter. In order to determine that direction, two indications are provided, namely, the direction of the current in L1 and L2 and the respective amplitude of these two currents.

There follows in C a resultant that is the algebraic sum of the currents in L1 and L2 according to the phases, i. e., in the final analysis, a curve determining at about 180° the direction of the transmitter through its maxima or its minima.

Referring to Fig. 3, two parallel and identical loops C1 and C2 are wound in opposite directions and placed on the same plane. They are connected respectively to the control grids G1, G2 of two electronic-discharge tubes V1, V2 of identical characteristics. The plates of these two tubes are coupled by a common connection to a tuned-secondary transformer T that applies these output currents to the control grid G5 of another tube V1.

Loops C1, C2 are such that they receive the same field, but on grid G1 are received voltages in phase opposition with respect to those impressed on grid G2, owing to the reverse winding of the loops.

If the two tubes V1, V2 amplify simultaneously, it is obvious that for a well-balanced circuit the voltages on G1 and G2 will oppose and cancel each other, so that no high-frequency current is impressed on grid G5 in the output circuit. If, on the contrary, the voltages on G1 and G2 are of different amplitude, a voltage will be obtained on G5 that will be the resultant of the voltages impressed on G1 and G2.

Figure 4:
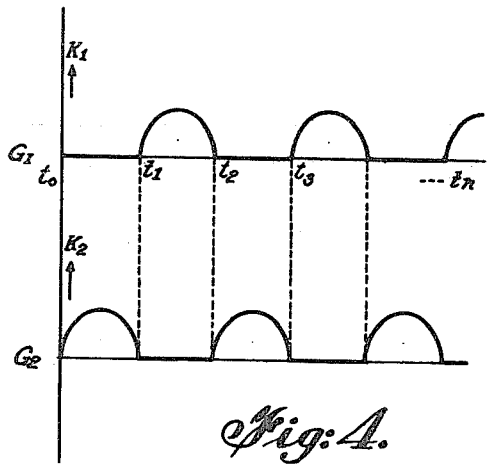
Fig. 4 represents a diagram of variation of the amplification coefficients of the tubes of Fig. 3.

According to a feature of the invention, the circuits of G1 and G2 are so arranged that the biasings, or particularly the amplification coefficients K1 and K2 of tubes V1 and V2, will vary by means of an external switching voltage source X in the manner shown by way of example in Fig. 4, which shows the variations of these amplification coefficients K1 and K2 as a function of the time.

The circuit shown in Fig. 3 comprises two tubes that, theoretically for equal biasing characteristics, amplify two identical currents in opposition and give a zero resultant.

The biasing voltages applied to grids G1 and G2 from source X are so chosen that the amplification coefficient will vary according to the particular law shown in Fig. 4, i. e., according to a sinusoidal law, by remaining zero for each half-alternation of a sign. The laws of variation of K1 and K2 are also reversed with respect to each other in time.

Figure 5:
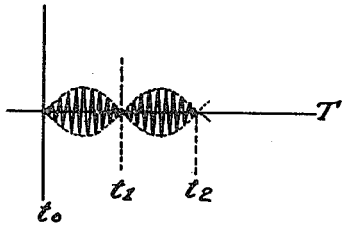
Fig. 5 represents a diagram of biasing voltages applied to the grids of the tubes of Fig. 3.

Fig. 5 shows the variation in time of the resultant current at G5. At $t_0$, the amplification of both tubes is equivalent and the resultant current is zero on G5; then, in proportion as $t_1$ is approached, the biasing current changes so that K varies and follows such a sinusoidal law that it becomes zero at $t_1$. During this variation from $t_0$ to $t_1$, grid G1 remains with a constant amplification-coefficient as shown by curve K1.

From $t_0$ to $t_1$ there has been obtained on G5 a high-frequency voltage whose phase is determined by the direction of C1 and whose amplitude has varied as the difference between the amplification coefficients of the two tubes V1 and V2. From $t_1$ to $t_2$ it is the reverse phenomenon that is produced and there is then on G5 a resultant of the same form as from $t_0$ to $t_1$ but of opposite phase.

It will be seen that the phenomenon is similar to that that occurs in the case of an ordinary finder having a rotor C turning in the field of winding L1 or L2 of Fig. 1. It suffices for this to compare the curves of Figs. 2 and 5.

From curves K1 and K2 of Fig. 4 it will be seen that the type of biasing current that gives such variations of amplification coefficients can be obtained, for example, by rectification through diodes or by switching an electronic beam from one target to another under the control of a sinusoidal switching voltage or in any other convenient manner to cut by half a sinusoidal current and use each of the alternations to bias each tube. Various embodiment examples will be given later on by way of illustration.

In order to produce the effect of winding L2 on rotor C of Fig. 1, the invention provides, according to one of its features, arranging a second assembly similar to that of Fig. 3 but in which the phases will be all displaced by 90° with respect to the assembly shown in that figure. The arrangement obtained then is the one shown in Fig. 6, where it is obvious that loops C3, C4 are orthogonal to loops C1, C2. This second arrangement may comprise the two loops C3, C4 and two tubes V3, V4 having control grids G3, G4 connected to loops C3, C4. The connection of output transformer T is common, as also the mixer tube V5 supplied by the transformer over its grid G5.

The current resultant will then be absolutely identical with that obtained from a turning-finder, but since there is no element mechanically in rotation, it is possible in this case to increase the frequency of the pseudo-envelope curve up to a high value, 600 cycles per second or more, without any particular difficulty.

In order to produce the sinusoidal switching voltage of X of broken half-cycles for the scanning of tubes V1 to V2 in the system of Fig. 3, a simple solution proposed as an example is shown in the arrangement of Fig. 7a. Transformer T' is supplied by a sinusoidal alternating source of 600 cycles, for example, as shown, and the two secondaries of this transformer are connected to two low-power rectifier tubes, consisting, for example, of a double diode DD, so that at the terminals of resistances R1, R2 will be obtained the voltages shown at F and G, i. e., half-cycles of a sinusoid displaced by 180° (Fig. 7b), which are then used to effect the alternated scanning of grids G1, G2.

For the assembly shown in Fig. 6 a switching voltage source S is used, but, as shown for example in Fig. 8a, the 600-cycle supply is transmitted to transformers T'1 and T'2 with a 90° phase-displacement produced by circuit R, C, a different amplification by tubes V6 and V7 being given if needed, as shown, to the two currents of 600 cycles in phase quadrature ahead of the transformers. The secondaries of these transformers supply four rectifier diodes or two double diodes DD1 and DD2 whose output circuits comprise the four resistances R1 to R4, whose terminal voltages serve to control the grids G1 to G4 respectively of tubes V1 to V4. In Fig. 8b are shown as a function of the time the variations of the potentials on grids G1 to G4, which allows seeing instantly the phase displacements and the form of these voltages.

Fig. 9 shows another embodiment of a circuit supplying scanning sinusoids for a static finder incorporating features of the invention. For these finders it is in effect necessary to have four sinusoids of the same amplitude but displaced by 90° with respect to one another. Moreover, the indication on the cathode-ray tube can be read by radial modulation of a circle produced by two sinusoids in quadrature and whose respective phase must always have an absolutely constant displacement with respect to the scanning voltages of grids G1 to G4. It is in such a case that the embodiment shown in Fig. 9 can be applied to advantage.

In the system shown in that figure it is assumed that there is available an alternating-current supply obtained from any generator, for example a 50-cycle source or any other source capable even in practice of having a terminal voltage of but 2. This source supplies the circuit shown at terminals A, B, and the current transmitted to transformer T1 can be adjusted by potentiometer P1. In the secondary of transformer T1, ahead of the output terminals C, D of the supply, is inserted a phase-shifting network, constituted by a potentiometer P2 and a capacity C1, whose arrangement can be that shown. Instead of resistance P2, it is obvious that an adjustable inductance may be used. In this manner, at the terminals C and D are applied two voltages whose relative phase can be adjusted by this phase-shifting network.

These two voltages are applied respectively to two tubes V8, V9 whose plate circuits are connected to transformers T2, T3 supplying the deflecting-plates or other beam-deflecting elements of a cathode-ray tube, at terminals E, F and G, H. When the output voltages of T2 and T3 are in quadrature and of the same value, a circular displacement of the spot will be obtained on the screen of the tube (not shown).

It should be noted that the voltages in C and D could be applied directly to two rectangular deflecting-plates; the same circle would be obtained on the screen of the cathode-ray tube, but the voltage in AB should then be higher.

In practice, however, the presence of the two tubes V8, V9, which makes it possible to use only a low voltage in A, B, should be considered primarily from the viewpoint of the relay function of these two tubes. The voltages developed in C and D cannot be used in a current circuit because, from the phase-displacement principle, the current is taken over one leg (that of C) and the voltage over the other leg (that of D). Now, after amplification in tubes V8 and V9, there will be available two identical currents, which is important for the control of the deflection and of the scanning. The circuits of transformers T2 and T3 are preferably provided with resonance frequencies approximating those of the sinusoidal voltage applied to terminals A, B.

The cathodes of tubes V8, V9 are suitably biased by adjustable tuned-circuits, shown at CA8, CA9, and it is obviously possible to produce a counterreaction by eliminating the cathode capacities. There are therefore available in EF and GH two sinusoidal voltages, which are put in quadrature by adjusting potentiometer P2 until the circle produced on the screen will blend with any desired circle, for example a graduated circle carried by that screen. The diameter of this circle is controlled by the adjustment of potentiometer P1.

It will be seen that with such a circuit no difficulty will be experienced in replacing the tubes, because it will suffice to readjust the circle by means of potentiometers P1 and P2 if the characteristics of the new tubes are not identical with those of the old ones.

The four sinusoids scanning the grids of tubes V1 to V4 of the static finder are obtained from the circular-modulation sinusoids of the electronic-beam of the indicator, for example in the manner shown in Fig. 10, which shows the output circuits provided for this purpose for the secondaries of transformers T1 and T2 of Fig. 9.

Two potentiometers P'1 and P'2 respectively connect the midpoints of T2 and T3 to a common point shown as being the ground. Small condensers C' of the same value shunt the secondary windings for the tuning of these secondaries as explained above. Thus are obtained four sinusoidal voltages E1, E2 and E3, E4, 90° out of phase with respect to one another, at the output of transformers T1 and T2. The arrangement of Fig. 10 shows that these voltages are taken between the ground connections and those of terminals E, F and G, H leading respectively to the scanning-plates $Px$, $Px'$ and $Py$, $Py'$ of the cathode-ray tube. However, these voltages can be taken between the ground connections and adjustable taps of potentiometers P'1 and P'2 in order to adjust them to the desired values.

Fig. 11 shows the six sinusoids thus obtained. At 5 and 6 are shown the two sinusoidal voltages in quadrature of the same amplitude, of the circular deflection of the spot on the screen of the indicator, i. e., the two voltages taken respectively at terminals EF and GH. At 1, 2, 3 and 4 are shown four sinusoidal voltages of the same amplitude but displaced by 90° with respect to one another for the scanning of the grids of tubes V1 to V4, taken between the connections of terminals E, F, G, H and the ground connections.

It should be understood that these supply methods are given only as an example, and in addition certain other devices supplying the required scanning-sinusoids will now be described with reference to the schematical embodiments of Figs. 12–17. Figs. 12–17 show various static-finder radio direction-finder circuits incorporating features of the invention, given here in order to describe certain methods of application of the invention but not to be regarded as limitative.

Figure 12:
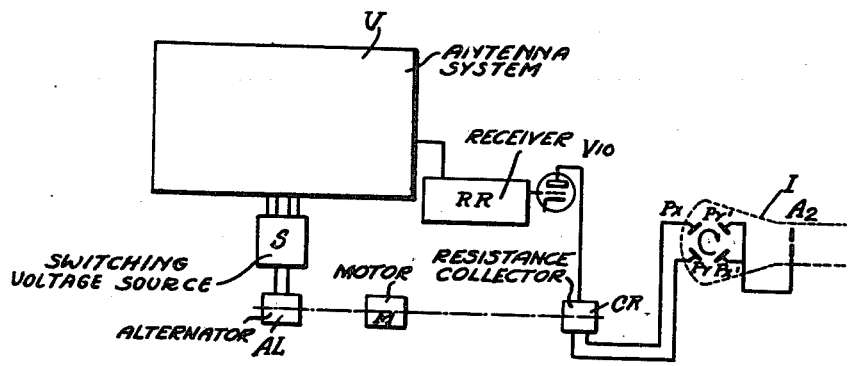

In the static-finder radio direction-finder embodiment of Fig. 12 an antenna system, V comprising for example two pairs of stationary loops C1, C2 and C3, C4 is arranged as described with reference to Fig. 6, and it should be understood that the radio receiver RR is assumed to contain the amplifier-tube arrangement of Fig. 6, the tube shown at V10 being the mixer tube V5 of Fig. 6. The circuit controlling the scanning on the grids of tubes V1 to V4 of the static finder distributing the half-sinusoid biases to each of the tubes is shown at S. It may, for example, as in Fig. 6, consist of the circuit of Fig. 8a, the alternating source being in the case shown a turning-alternator AL driven by a motor M that likewise drives a sinusoidal-distribution resistance-collector CR of any suitable type. The connections between alternator AL, motor M and turning-collector CR may be either electrical or mechanical. Resistance-collector CR is provided with two brushes at 90° from each other in order to furnish two sinusoidal currents in phase quadrature and modulated by the energy picked up by the two pairs of loops C1, C2 and C3, C4. The connections of these two brushes lead to the deflecting-plates of cathode-ray indicator I in order to cause the cathodic spot of this indicator to describe a circle modulated radially by the energy picked up by wave-collectors C1 to C4. With the arrangement shown, the output currents in quadrature of resistance-collector CR are applied to only two plates of indicator I, for example $Px$ and $Py$, while the other two plates ($Px'$ and $Py'$) are controlled with the grid or anode A2 in any well-known suitable manner to cut the cathodic beam during the portions of its rotation that are not modulated radially.

In this embodiment, it is also possible to eliminate alternator AL if an external alternating-source of sufficient stability is available. A motor synchronized to such external alternating-source is then used to drive the turning resistance-collector.

Figure 13A:
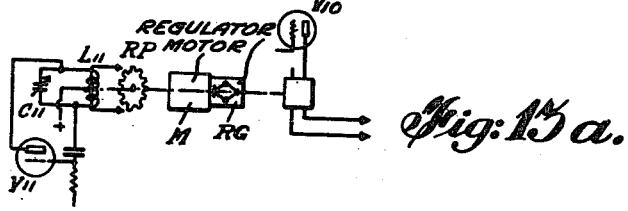
Figure 13B:
Figure 14:
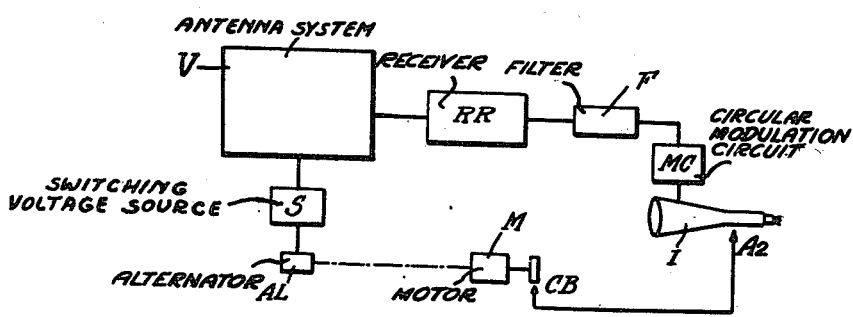

When only a very unstable low voltage supply is available, use may be made of the arrangement shown in Fig. 13a or its modification shown in Fig. 13b. The oscillatory circuit of low frequency oscillator tube V11 of receiver RR is provided with an oscillatory circuit C11—L11 whose inductance L11 takes the form of a compact coil (Fig. 13a) or two windings (Fig. 13b) serving as an inductor for a phonic wheel RP keyed on the end of the shaft of motor M, which has nothing else to drive but turning-collector CR. In rotating, motor M then takes the rate of oscillator V11. If a summary regulation is available for the motor, say, by means of a regulator RG, an effective complementary stabilization is thus obtained.

In order to prevent the pendular swinging of the assembly, it is necessary, of course, that the motor and the phonic wheel be the ones that determine the frequency of the oscillator; the assembly is then stabilized at the resonance frequency. The stabilized alternating-current produced is then used to create the half-sinusoids biasing the grids of input tubes V1 to V4 (not shown).

The static finder described above, an example of which is given in Fig. 6, can further be used to supply a receiver RR whose detector tube is connected to a low-frequency filter F (Fig. 14) in order to refine the detected envelope-curve. Filter F supplies an output tube in a circular-modulation circuit MC, which converts the sinusoid produced in the filter into two sinusoids in quadrature controlling the deflection of the spot of indicator I. Circuit MC may preferably contain an automatic volume-control of well-known structure for keeping constant the output level of MC and hence obtaining constant circle-diameters on the screen of cathode indicator I.

The scanning circle having thus been produced on indicator I, all that remains is to cause the spot to describe a radial line in order to obtain the direction indication. There are two different ways of doing that: The first relates to the case where a local low-frequency oscillator is available for producing the scanning voltage (Fig. 13a). It suffices then to take this sinusoidal voltage and to convert it into a current peak at all the periods of the voltage, which may be done in known manner. The current peak thus produced is applied to the whole or part of the voltage of the external anode of the cathode-ray tube and thus performs the radial modulation of the spot. On the screen of the tube will appear a circle of a diameter or a radius whose angle with the ship's head will indicate the phase or the direction.

The second way of obtaining a radial modulation uses an alternator that produces the A. C. scanning the biases of the input tubes (Fig. 14) and carries on its shaft a collector CB having but one contact of small peripheral width, which gives the spot a short deflecting-pulse when the electrical pulse supplied by this contact is applied to an electrode such as A2 of the cathode tube. The pulse thus produced may also be used to modulate the amplitude of the circle described on the cathode indicator. Or further, still by means that are suitable although not specifically forming part of the present invention, the sinusoid scanning the input grids may be used to produce the circle on the screen of the indicator, using the detected and filtered sinusoid to produce the radial deflection.

Generally, in a radio direction-finder incorporating features of the invention, there are available two sinusoids of the same frequency but the phase of which, displaced to a certain extent, characterizes the direction sought. This phase-difference can be measured in a number of ways also not specifically forming part of the instant invention.

Figs. 15 and 16 show by way of illustration a still further application of the static finders provided by the invention. In these figures, the wave-collecting antennas shown are of the Adcock type. In numerous cases, in fact, and particularly for wavelengths of the order of one meter or of a few meters, such collectors offer, as is known, many advantages over loops.

In Fig. 15 one of the pairs of rectilinear antennas of an Adcock system is shown at A1, A2. These rectilinear antennas are shown coupled at their base by a connection comprising a self-inductance coil B, serving as the primary of the transformer that transfers the picked-up energy to the receiver. It should be understood, however, that these antennas could consist of dipoles in two portions arranged one after the other, crossed connections coupling the upper portion of each dipole to the lower portion of the other, and inductance B being connected at each of its ends to the center of each connection, according to a well-known arrangement.

At the output terminals F, G of the transfer-transformer secondary a H. F. voltage is obtained whose amplitude is a function of the orientation of the plane of antennas A1, A2 with respect to the transmitter. The secondary of the transfer-transformer is tuned as shown by variable capacity CA and the ends F, G are balanced with respect to the ground as shown. The high-frequency voltages applied to the grids G1, G2 of two tubes V1, V2 of the static finder are, therefore, in phase opposition. Biasing circuits R1, C1 and R2, C2 are shown for grids G1 and G2, respectively. It will be seen from Fig. 3 that when the biases of R1 and R2 are identical and such that the two tubes are in opposition, no voltage will be obtained at H from the common output-transformer of the stage.

Instead of the induction coupling shown at B between the antennas and the tube circuit, it is obvious that the antennas could be connected directly to F and G, provided the balancing of the circuit be retained.

By applying then to grids G1 and G2 biases such as shown in Fig. 4, that is, constituted by half-sinusoids respectively displaced by half a cycle, a high frequency envelope-curve will be obtained in H, as explained above with reference to Fig. 3. By adding a second arrangement of rectilinear antennas and of amplifier tubes having biases constituted by half-sinusoids displaced by 90° with respect to those of the first arrangement, so as to obtain a circuit similar to that of Fig. 6 but with vertical antennas instead of loops, an envelope-curve will be obtained at H whose phase will give the direction of the transmitter.

For ultra-short waves it will then be easy to arrange an Adcock assembly, such as shown schematically in Fig. 16, where the 4 antennas A1, A2 and A3, A4, plus the vertical sense-finding antenna C, are shown mounted around a junction box D, containing tubes V1 to V4, to which box are directly connected the scanning and phase-indicating circuits, say by means of an I. F. down-lead MF, whose current from the frequency-changer will then be suitably amplified.

Figure 17:
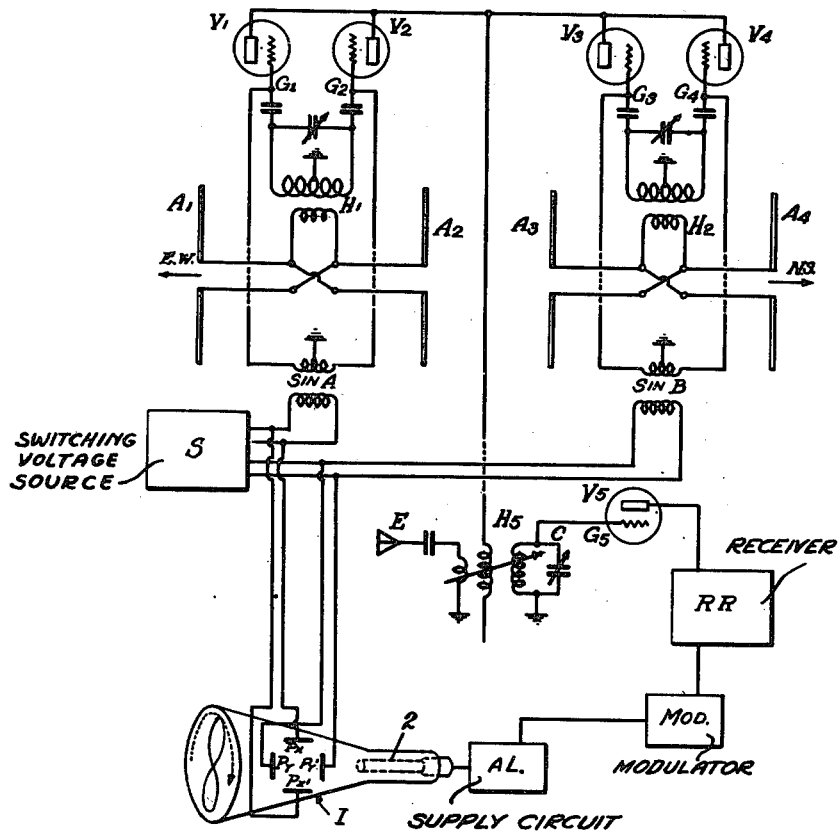

Fig. 17 further shows schematically a more-detailed example of a radio direction-finder having a static finder and rectilinear antennas according to certain features of the invention.

In that figure, four electronic-discharge elements V1, V2 and V3, V4, which may be constituted either by triode tubes or by double tubes or multi-grid tubes such as pentodes, have their respective grids G1, G2 and G3, G4 coupled by tuned- and balanced-secondary transformers H1, H2 to two orthogonal pairs of dipoles A1, A2 and A3, A4 of an Adcock system in the manner shown. These four tubes have a common plate-circuit constituted by a coupling by tuned-secondary transformer H5 leading to a frequency-changing tube V5 for example.

This frequency-changing tube supplies receiver RR, which detects the received wave and directs the envelope-curve towards a modulator MOD.

At E is shown the down-lead of a vertical sense-finding antenna terminated by a winding of H6 in order to provide the well-known cardioid characteristic for the sense-finding or for the compensation of the antennas.

Depending upon the orientation of the transmitting source whose direction it is desired to determine, antennas A1, A2 and A3, A4 will pick up different voltages of definite phase. The result will be integrated in the tuned input-circuit of tube V5 and, if the amplification coefficients of tubes V1 to V4 remain constant, the detected envelope-curve will be the image of the transmitted energy; but if the biases of input grids G1 to G4 vary, a variation will result in the detected envelope-curve.

To grids G1 to G4 are applied sinusoidal voltages sinA and sinB displaced by 90° and produced in any suitable manner by a generator S, which for example may be of a type shown in Fig. 8a, or of any other suitable type. Owing to the opposition of the circuits of grids G1 and G2, on the one hand, and G3 and G4 on the other, there are, as described above, four modulation sinusoidal-voltages on these input grids. In other words, at each instant if the phase of the sinusoidal modulation on grid G1 is taken as origin, it will be lagging by 90° with respect to G3, by 180° with respect to G2 and by 270° with respect to G4.

However, the high-frequency voltages applied to the grids by the dipole antennas have relationships that define, by their voltages and their phases, the bearing of the transmitting station, and in the input circuit of tube G5 will be picked up the resultant of the voltages with a maximum and a minimum whose phase is well defined with respect to the origin phase taken on grid G1.

Modulator circuit MOD will therefore apply to the supply circuit AL of the cathode-ray tube used as indicator I the modulation of the detected envelope-curve so as to modulate the anode 2 of this tube in a manner known in itself; modulation of this type effectively produces a radial deflection of the spot on the screen of the cathode-ray tube.

Further, the sinusoidal voltages from generator S are simultaneously sent over the coupling transformers to grids G1 to G4 and to the two pairs of deflecting-plates Px, Px' and Py, Py' of cathode-ray tube I. These voltages in quadrature will produce on the screen of indicator I a circle whose origin phase on grid G1 will be in a quite definite position of the spot at each of its turns. The modulation bringing the spot back towards the center at each turn will give a classical image such as shown for example in the drawing, whose angle with the origin position will give the bearing sought.

It is obvious that the invention is not limited to the embodiments shown and described but that on the contrary it is capable of many modifications and adaptations without departing from its scope. It is, for example, possible to use cathode-ray tubes whose deflection is controlled by electromagnetic instead of electrostatic deflecting-means. Other circuits than those described may be used to produce the sinusoidal scanning-voltages, or else the biases of the grids of the static finder may vary according to other laws. Finally, it should be understood that only the details of the elements required for an understanding of the invention have been given in the various examples shown and described, but not the details of devices or elements known in themselves and readily realizable by those skilled in the art for the embodiment of the invention.

I claim:

1. A radio direction finding system comprising a pair of directional antennas arranged in quadrature and in fixed position, an indicating device capable of being controlled in a two coordinate system, means to control said indicating device in one coordinate cyclically at a predetermined rate, means cyclically to reverse the direction of currents received by said antennas at a rate which is twice that of the cyclical rate of control of said indicating device and according to a predetermined law, means to combine the signals from said two antennas, means to detect the combined signals, and means to utilize a characteristic of said combined detected currents to control said indicating device in the other coordinate.

2. A radio direction finding system in accordance with claim 1, in which the antennas each comprise a pair of oppositely wound loops mounted in the same plane and having equal characteristics and the means to reverse the current from the antenna comprises electronic means to connect the two loops alternately to an output circuit.

3. A radio direction finding system in accordance with claim 1, in which each of said antennas comprises a pair of antenna units arranged to receive signals in reverse direction and in which each unit is controlled by a tube the grid bias of which is varied sinusoidally, the grid bias of the two tubes being 180° out of phase.

4. A radio direction finding system in accordance with claim 1, in which the indicating device is a cathode ray tube.

5. A radio direction finding system comprising a pair of directional antennas arranged in fixed quadrature position, each of said antennas comprising a pair of antenna units of equal characteristics but arranged so that one unit delivers a current in the reverse direction from that of the other unit, a tube having its grid circuit connected to each of said units, means to vary the bias of said tube sinusoidally at a predetermined frequency, the bias of one tube being 180° out of phase with the bias on the other tube, means to combine the output circuits of said tubes, means to detect the signal in said combined output circuit, an indicating device capable of control in a two coordinate system, means to utilize a characteristic of the output of said detecting means to control said indicating device in one coordinate, and cyclically operated means at a frequency which is one half the value of the frequency of the variation of grid bias of said tubes for controlling said indicating device in the other coordinate.

6. A radio direction finding system in accordance with claim 5, in which the antenna units of each antenna comprises identical loops oppositely wound.

7. A radio direction finding system in accordance with claim 5, in which the signals from the antenna units are all combined in a mixer tube by applying them to the grid of the tube.

8. A radio direction finding system in accordance with claim 5, in which the sinusoidal wave for varying the bias of each antenna unit control tube as well as the sinusoidal wave for controlling the indicating device in one coordinate are produced by a generator.

9. A radio direction finding system comprising a pair of directional antennas arranged in fixed quadrature position, each of said antennas comprising a pair of antenna units of equal characteristics and arranged so that one will deliver a signal current reversed from that of the other, a separate tube for each of said units, said unit being connected to the grid of its associated tube, means for producing two sinusoidal waves in quadrature and, for producing two sinusoidal waves 180° out of phase and at a frequency twice that of said first mentioned two sinusoidal waves, means to vary the grid bias of one of said tubes associated with an antenna by half cycles of one of the sinusoidal waves of higher frequency, means to vary the grid bias of the other tubes by the same half cycles of the other of said higher frequency sinusoidal waves, means to combine the outputs of said tubes, means to detect the combined outputs of said tubes, a cathode ray tube having a deflection circuit and another electrode arranged for deflecting the spot of said tube towards or away from the center thereof, means to deliver the sinusoidal waves of lower frequency to said deflection circuit to cause the spot of said cathode ray tube to trace a circle on the face of said tube, and means to deliver the output of said detecting means to said other electrode.

10. A radio direction finding system in accordance with claim 9, in which an omnidirectional antenna is provided and the signal therefrom combined with the output of said tubes.

11. A radio direction finding system in accordance with claim 1, in which an omnidirectional antenna is provided and the output thereof combined with the output of said directional antennas.

RENÉ HARDY.

REFERENCES CITED

The following references are of record in the file of this patent:

UNITED STATES PATENTS

| Number | Name | Date |
|---|---|---|
| 2,234,587 | Budenbom | Mar. 11, 1941 |
| 2,284,475 | Plebanski | May 26, 1942 |
| 2,288,815 | Luck | July 7, 1942 |
| 2,318,338 | Simon et al. | May 4, 1943 |